H. H. HARDT.
INDICATOR FOR BALING PRESSES.
APPLICATION FILED JAN. 25, 1921.

1,399,478.

Patented Dec. 6, 1921.
2 SHEETS—SHEET 1.

WITNESSES
J. Herbert Bradley.

INVENTOR
Henry H. Hardt
by Winter & Brown
his attorneys

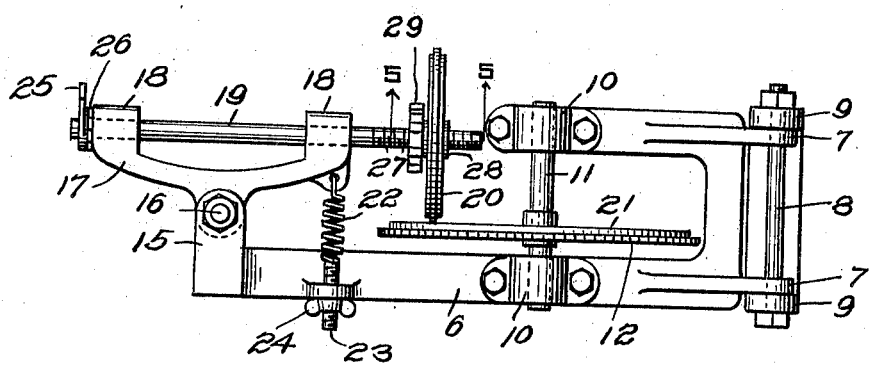
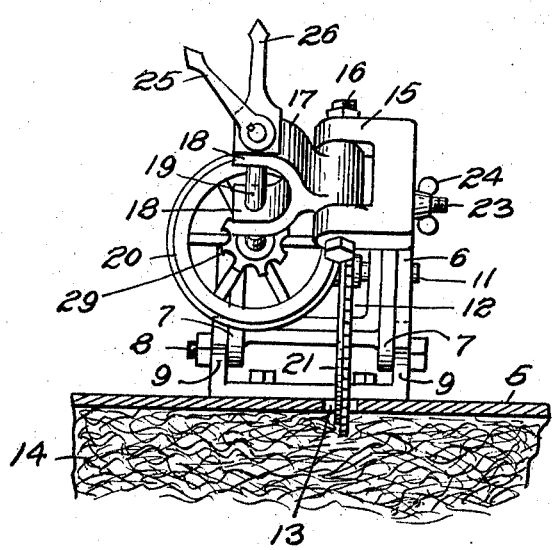
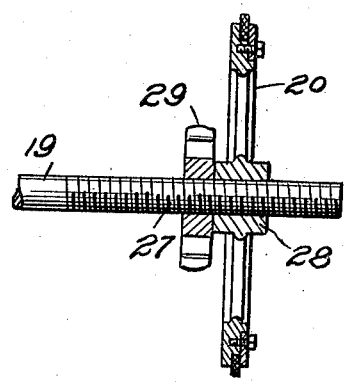

UNITED STATES PATENT OFFICE.

HENRY H. HARDT, OF GIBSONIA, PENNSYLVANIA.

INDICATOR FOR BALING-PRESSES.

1,399,478.  Specification of Letters Patent.  Patented Dec. 6, 1921.

Application filed January 25, 1921. Serial No. 439,793.

*To all whom it may concern:*

Be it known that I, HENRY H. HARDT, a citizen of the United States, and a resident of Gibsonia, in the county of Allegheny and State of Pennsylvania, have invented a new and useful Improvement in Indicators for Baling-Presses, of which the following is a specification.

This invention relates to indicators for baling presses. Its object is to provide a simple and efficient indicator which can be readily applied to any hay or similar baling press of conventional construction for the purpose of indicating when a bale of the desired length has been formed so that the operator may insert a follower block, thus enabling bales of uniform length or size to be produced. Further objects are to provide an indicator for the purpose specified which is positive and reliable in its action, which obviates any slippage or jumping of the indicating device relative to the bale being formed; which can be quickly and easily adjusted without stopping the operation of the press in case it is found that the bales are not being formed of the desired length or size; which is so constructed that the indicator is readily visible to the operator; which can be so located that it is out of the way and therefore not liable to be injured; and which can be connected to the press so that it does not interfere with the insertion of the baling wires, and so that it can be readily moved to entirely withdraw the actuating wheel from the baling chamber.

Figure 1:
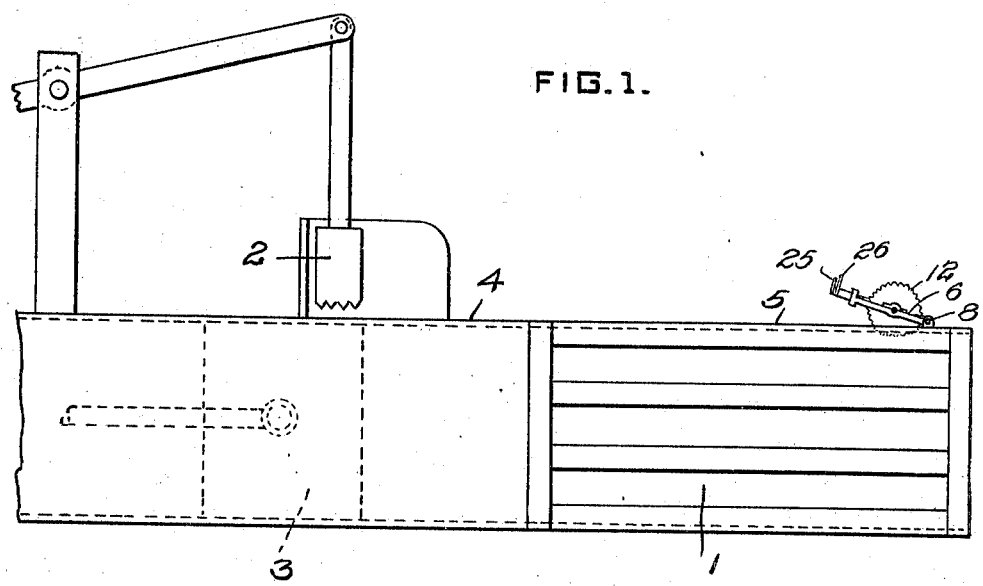
Figure 2:
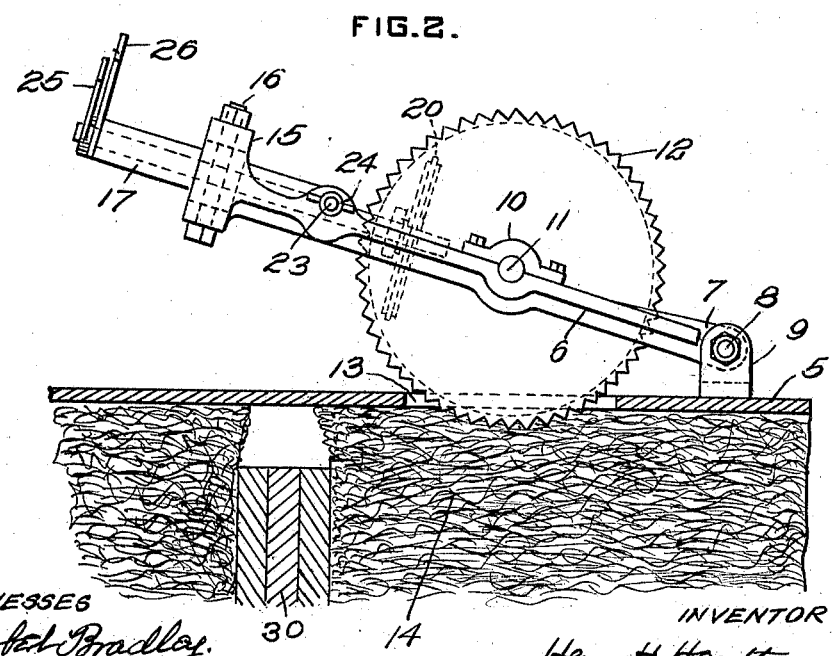

In the accompanying drawings Figure 1 is a general view in side elevation of a hay baling press showing the indicator applied thereto; Fig. 2 is a vertical longitudinal section through a portion of the compression chamber showing the application of the indicating device thereto; Fig. 3 is a plan view of the same; Fig. 4 is an end view of the same as viewed by the operator; and Fig. 5 is a sectional detail on the line 5—5, Fig. 3.

In the drawings 1 indicates the compression chamber of a conventional type of hay baling press, 2 indicates the feeding ram and 3 the compressing ram, all of which may be of the usual construction and operated in the usual way. 4 indicates generally the position at which the operator stands when feeding the hay or similar commodity to the press.

The indicating device is arranged to be mounted on the top 5 of the compression chamber, preferably near the outlet end thereof, so as to be actuated by the bale when in its most compressed and uniform condition.

The indicating device comprises a main frame 6, which in outline is roughly the form of the letter G. This frame is adapted to be pivotally connected to the frame of the baling press, such as having the base thereof provided with ears 7 arranged to be hinged, by a horizontal pin or bolt 8, to corresponding ears on a member 9 secured to the top 5 of the baling press. Mounted in suitable bearings 10 in the two arms of the press is a horizontal shaft 11 to which is secured a toothed or serrated wheel 12, which may be a steel plate formed substantially like a circular saw, or similar toothed or serrated wheel or disk, and which is arranged to project through a slot 13 formed in the top of the compression chamber, so that its periphery will engage the bale 14 being formed in said compression chamber.

The outer end of the longer arm of the main frame 6 is turned to one side, and its extreme end is forked, as at 15, and has pivotally connected thereto, on the pivot 16, a supplementary or rocking frame member 17, the ends of which are provided with bearings 18 in which is mounted a shaft 19 at right angles or normal to the shaft 11, and which extends down at one side of the serrated wheel 12. To shaft 19 is secured a friction wheel 20, the periphery of which engages a side face of the serrated wheel 12. Preferably the serrated wheel 12 is provided with a non-corrodible surface against which the friction wheel 20 bears, such as by having secured thereto a disk 21 of aluminum or like metal. The peripheral face of friction wheel 20 may be formed in any suitable way to have the necessary frictional contact with the wheel 12, such as by providing its periphery with a leather or similar band, or the like.

The friction wheel 20 is yieldingly held against the side face of the actuating wheel 12 in a manner to always maintain the frictional pressure uniform, and no heavier than is necessary to secure the necessary drive, thus obviating strain and loss of power. As shown this yielding pressure is supplied by means of a tension spring 22 which connects the lower end of the rocking frame 17 to the main frame 6. Preferably means are provided for varying or adjusting the tension of spring 22, such as connecting said spring to a rod 23 which passes through the main frame 6, and on its outer end is threaded and engaged by the winged nut 24. In this way the pressure of friction wheel 20 on serrated wheel 12 can be readily varied, and this can be done without stopping the machine.

The shaft 19 operates any suitable indicator. As shown the outer end of said shaft is provided with a pointer or finger 25, cooperating with a stationary pointer or finger 26 secured to the outer end of the rocking frame 17. When these two pointers or fingers coincide it indicates to the operator that the bale is of the desired length or size.

In order to adjust the machine for making bales of different sizes or lengths, or to make bales of uniform size or weight with varying kinds of material (such as straw or hay, or different kinds of hay) the following adjustment is provided: The inner end of shaft 19 is provided with a threaded portion 27, and the hub 28 of wheel 20 is formed as a nut engaging this threaded portion, so that by turning the wheel 20 on shaft 19 its point of contact with the side face of the wheel 12 can be varied, and thus the speed at which shaft 19 is driven from wheel 12 can be varied. Any suitable means may be used for fastening the friction wheel 20 to shaft 19 in its adjusted position, such as a lock nut 29 working on the threads 27 and engaging the hub of the wheel 20, and provided with a gripping periphery or ring so it can be readily operated by hand.

In operating hay and similar presses the bales are weighed, and if the attendant finds that the bales are not running of the proper size, he can rock the frame 17 to bring the wheel 20 out of engagement with the wheel 12, and then by loosening the lock nut 29 can rotate the wheel 20 in the desired direction to make the necessary adjustment, and then tighten the lock nut 29, whereupon by merely releasing the rocking frame 17 the spring 22 immediately brings the friction wheel 20 into engagement with the wheel 12. This adjustment can be quickly made and without stopping the press.

The frame 6 is hinged to the top of the compression chamber in such way that said frame and the device carried thereby stand in a forwardly inclined position, as shown in Fig. 1, thus presenting the indicator fingers 25, 26 in the direction of the operator who feeds the machine. When he observes the finger 25 approaching the position of finger 26 he is advised that the bale is nearly of the desired size and thereafter can regulate the amount of hay supplied to the feeding ram so that a bale of exactly the required size will be produced. He will then drop in another follower block 30.

Should the operator slightly over-feed or under-feed so that a finished bale is not exactly the desired length, and in which event the fingers 25 and 26 will not exactly register on the completion of the bale, this would also result in a second misformed bale were it completed at the next registering of said fingers. In order to avoid the inaccurate formation of one bale necessitating the inaccurate formation of the succeeding one, it is merely necessary to manually swing frame 17 slightly and move the pointers 25 and 26 into alinement at the beginning of the formation of the succeeding bale, thus securing an accurate measurement thereof regardless of the error in the preceding one. This is found to be of great practical importance in the operation of the device.

Furthermore this inclined position of the indicator frame enables the device as a whole to ride on the bale being formed, and maintains a uniform pressure of the actuating wheel 12 on the bale. The serrated periphery of this actuating wheel prevents slippage due to the intermittent action of the compressing ram, and as the wheel is always held in uniform contact with the top surface of the bale, the indicator will accurately show the building up of the bale. By locating the device near the exit end of the compression chamber, the actuating wheel will be in contact with that part of the bale which is most firmly compressed and therefore has the most uniform surface. Also this locates the indicator in a position where it is out of the way of the feeding operator, and therefore not liable to be injured, and being located on top of the press it does not interfere with the insertion of the bale ties. Whenever desired the frame can be swung up and thus entirely withdraw the actuating wheel from the compression chamber.

The device is very convenient and efficient in operation. It is so constructed that the indicator accurately shows the condition of the bale. All the adjustments provided are simple and can be quickly made without stopping the baling press and done while it is in action.

I claim:

1. An indicator for baling presses comprising a frame, a serrated wheel rotatably mounted therein on a horizontal axis, said frame being provided with means to pivotally mount the same on a horizontal axis on top of the press in an inclined position with said wheel projecting into the compression chamber and riding on the bale being formed, a shaft mounted in said frame normal to the axis of said serrated wheel, a friction wheel longitudinally adjustable on said shaft and peripherally engaging the side face of said serrated wheel, and an indicator actuated by said shaft.

2. An indicator for baling presses comprising a frame, a serrated wheel rotatably mounted therein on a horizontal axis, said frame being provided with means to pivotally mount the same on a horizontal axis on the top of the press in an inclined position with said wheel projecting into the compression chamber and riding on the bale being formed, a shaft mounted in said frame normal to the axis of said serrated wheel, a friction wheel longitudinally adjustable on said shaft and peripherally engaging the side face of said serrated wheel, means to yieldingly hold said friction wheel against the face of the serrated wheel with a uniform pressure, and an indicator actuated by said shaft.

3. An indicator for baling presses comprising a frame, a serrated wheel rotatably mounted therein on a horizontal axis, said frame being provided with means to pivotally mount the same on a horizontal axis on the top of the press in an inclined position with said wheel projecting into the compression chamber and riding on the bale being formed, a shaft mounted in said frame normal to the axis of said serrated wheel, a friction wheel longitudinally adjustable on said shaft and peripherally engaging the side face of said serrated wheel, an adjustable spring for yieldingly holding said friction wheel against the face of said serrated wheel, and an indicator actuated by said shaft.

4. An indicator for baling presses comprising a frame, a serrated wheel rotatably mounted in said frame, a shaft normal to the axis of said serrated wheel, a friction wheel on said shaft peripherally engaging the side face of said serrated wheel, a rocking member in which said shaft is mounted, means for biasing said bearing member to hold said friction wheel in engagement with said serrated wheel, and an indicator operated by said shaft.

5. An indicator for baling presses comprising a frame, a serrated wheel rotatably mounted in said frame, a shaft normal to the axis of said serrated wheel, a friction wheel on said shaft peripherally engaging the side face of said serrated wheel, a rocking member in which said shaft is mounted, means for biasing said bearing member to hold said friction wheel in engagement with said serrated wheel, means for adjusting said friction wheel longitudinally on said shaft, and an indicator operated by said shaft.

6. An indicator for baling presses comprising a frame arranged for pivotal connection to the baler frame, a serrated wheel rotatably mounted in said frame and arranged to engage the bale in the press, a bearing member pivotally connected to said frame, a shaft mounted in said bearing member normal to the axis of the serrated wheel, a friction wheel longitudinally adjustable on said shaft and peripherally engaging the side face of the serrated wheel, and an indicator actuated by said shaft.

7. An indicator for baling presses comprising a frame arranged for pivotal connection to the baler frame, a serrated wheel rotatably mounted in said frame and arranged to engage the bale in the press, a bearing member pivotally connected to said frame, a shaft mounted in said bearing member normal to the axis of the serrated wheel, a friction wheel on said shaft and peripherally engaging the side face of said serrated wheel, threaded means for adjusting said friction wheel longitudinally on said shaft, and an indicator operated by said shaft.

In testimony whereof, I have hereunto set my hand.

HENRY H. HARDT.

Witness:
 ALIN A. TRILL.